US012806688B2

(12) United States Patent
Gyllenflykt et al.

(10) Patent No.: US 12,806,688 B2
(45) Date of Patent: Nov. 24, 2026

(54) USE OF A THERMOSET BINDER FOR 3D PRINTING OF CEMENTED CARBIDE OR CERMET BODIES

(71) Applicant: SANDVIK MACHINING SOLUTIONS AB, Sandviken (SE)

(72) Inventors: Tobias Gyllenflykt, Stockholm (SE); Magnus Bostrom, Sandviken (SE)

(73) Assignee: Sandvik Machining Solutions AB, Sandviken (SE)

(*) Notice: Subject to any disclaimer, the term of this patent is extended or adjusted under 35 U.S.C. 154(b) by 882 days.

(21) Appl. No.: 17/787,456

(22) PCT Filed: Dec. 9, 2020

(86) PCT No.: PCT/EP2020/085334

§ 371 (c)(1),
(2) Date: Jun. 20, 2022

(87) PCT Pub. No.: WO2021/122238

PCT Pub. Date: Jun. 24, 2021

(65) Prior Publication Data

US 2023/0040883 A1 Feb. 9, 2023

(30) Foreign Application Priority Data

Dec. 20, 2019 (EP) .................................... 19219174

(51) Int. Cl.

| | |
|---|---|
| ***B22F 10/14*** | (2021.01) |
| ***B22F 1/10*** | (2022.01) |
| ***B29C 64/165*** | (2017.01) |
| ***B33Y 10/00*** | (2015.01) |
| ***B33Y 70/00*** | (2020.01) |
| ***C22C 29/02*** | (2006.01) |
| ***C22C 29/06*** | (2006.01) |

(52) U.S. Cl.
CPC ................ *B22F 10/14* (2021.01); *B22F 1/10* (2022.01); *B29C 64/165* (2017.08); *C22C 29/02* (2013.01); *C22C 29/06* (2013.01); *B22F 2998/10* (2013.01); *B33Y 10/00* (2014.12); *B33Y 70/00* (2014.12)

(58) Field of Classification Search
CPC ......... C22C 1/051; C22C 29/02; C22C 29/06; B22F 1/10; B22F 10/14; B22F 2998/10; B22F 3/10; B22F 1/148; B22F 10/00; B29C 64/165; B33Y 10/00; B33Y 70/00; Y02P 10/25
See application file for complete search history.

(56) References Cited

U.S. PATENT DOCUMENTS

| | | | | |
|---|---|---|---|---|
| 2005/0082710 A1 | 4/2005 | Oriakhi et al. | | |
| 2011/0086567 A1 | 4/2011 | Hawkins | | |
| 2018/0229442 A1* | 8/2018 | Ucar | ...................... | B33Y 40/10 |
| 2019/0054527 A1 | 2/2019 | Natarajan et al. | | |
| 2019/0270135 A1 | 9/2019 | Vladek et al. | | |

FOREIGN PATENT DOCUMENTS

WO WO-2019027417 A1 * 2/2019 ................ B22F 1/10

* cited by examiner

*Primary Examiner* — Adil A. Siddiqui
(74) *Attorney, Agent, or Firm* — Corinne R. Gorski

(57) ABSTRACT

The use of a water-soluble thermoset binder for binder jetting of a cemented carbide or cermet green body is provided. The water-soluble thermoset binder includes a compound A, being at least one organic, non-aromatic substance, including at least two hydroxyl groups and a compound B, being at least one organic, non-aromatic substance, including at least two carboxyl groups, wherein the compound A and compound B are monomers or oligomers. The binder will lead to an increased strength of the printed green body.

7 Claims, No Drawings

USE OF A THERMOSET BINDER FOR 3D PRINTING OF CEMENTED CARBIDE OR CERMET BODIES

RELATED APPLICATION DATA

This application is a § 371 National Stage Application of PCT International Application No. PCT/EP2020/085334 filed Dec. 9, 2020 claiming priority to EP 19219174.0 filed Dec. 20, 2019.

The present invention relates to the use of a water-soluble thermoset binder for binder jetting of a cemented carbide and cermet green body. The water-soluble thermoset binder comprises a compound A being at least one organic, non-aromatic substance, comprising at least two hydroxyl groups and a compound B being at least one organic, non-aromatic substance, comprising at least two carboxyl groups, wherein the compound A and compound B are monomers or oligomers.

BACKGROUND

Additive manufacturing, also known as 3D printing, generally involves printing and articulate one layer at a time using specialized systems. In particular, a layer of material may be deposited on the working surface of a build chamber and bonded with another layer of the same or a different material. Additive manufacturing may be used to manufacture articles from computer-aided design models using techniques such as, but not limited to, powder bed fusion (PBF), direct metal laser sintering (DMLS) or binder jet 3D printing.

Additive manufacturing of cemented carbide or cermet bodies are preferably done by a 3D printing technique that first creates a green body after which the green body is sintered in a separate furnace. Binder jetting is the most common type of such 3D printing technique.

When printing cemented carbide and cermet bodies using binder jetting, the strength of the printed body, i.e. the green strength, must be enough to avoid breakage of the body during the subsequent handling, like e.g. depowdering, moving the bodies to a sintering furnace etc.

Thermoset binders, i.e. a chemical binder that reacts at an elevated temperature, are known in binder jetting of powders. In some applications one component is added together with the powder whereas the other component is added during printing after which the printed body is cured. For cemented carbide and cermet powders this is disadvantageous since one of the main issues is porosity in the sintered bodies. Adding one component to the powder decreases the powder-powder contact and could lead to more porosity, or binder rich areas in the sintered state.

Thermoset binders containing different types of polymers are the most common. However, due to solubility, the concentration of the polymers must be kept low and large amounts of solvent is added during printing which can lead to problems when drying the printed body.

There are also epoxy binders, but they are usually neither environmental nor health-friendly.

Another type of binders for use in binder jetting are binders that does not react chemically during curing but instead, polymers are entangled and thus increase the green strength. These binders can, if wet depowdering is used, be dissolved by the cleaning fluid and the green body will then lose its strength.

US2019/0054527 describes a binder for binder jetting of e.g. ceramics comprising two different polymers that will, during curing, non-covalently, couple the two different types of polymers.

One object of the present invention is to obtain a binder that is less hazardous.

Another object of the invention is to obtain a binder for binder jetting that can be added in a higher concentration, i.e. with less solvent.

Another object of the invention is to obtain a binder for binder jetting that lead to an increased green strength.

Another object of the invention is to obtain a binder for binder jetting that does not dissolve after curing, i.e. during depowdering etc.

DETAILED DESCRIPTION OF THE PRESENT INVENTION

The present invention relates to the use of a water-soluble thermoset binder for binder jetting of a cemented carbide or cermet green body. The water-soluble thermoset binder comprises a compound A being at least one organic, non-aromatic substance, comprising at least two hydroxyl groups and a compound B being at least one organic, non-aromatic substance, comprising at least two carboxyl groups, wherein the compound A and compound B are monomers or oligomers with a molecular weight less than 2000 g/mol.

By thermoset binder is herein meant that the components in the binder will harden by curing. Curing is usually induced by heating.

The thermoset binder comprises a compound A and a compound B and possibly also other additives such as pH adjusters, surfactants etc. The compounds A and B should have low, or no reaction rate at room temperature to achieve a reasonable shelf life.

Compound A and B are both water soluble. By water soluble is herein meant that the compounds A and B described herein are soluble in water in the amounts given below. Both compound A and B are monomers or oligomers. By oligomer is herein meant that that a compound with a molecular weight below 2000 g/mol, preferably less than 1000 g/mol.

The compounds A and B are also non-aromatic substances which is herein meant that compounds A and B are free from aromatic groups such as benzyl groups, phenyl groups etc. Aromatic substances are unwanted since it can form harmful byproducts during the debinding and/or sintering.

Compound A and B will, after the green body is subjected to an elevated temperature during curing, react by cross linking and forming ester-bonds to form a green body with high strength Compound A comprises at least one organic, non-aromatic, substance comprising at least two hydroxyl groups and where compound A is a monomer or an oligomer. Compound A can either be constituted by only one single organic, non-aromatic substance comprising at least two hydroxyl groups or being a mixture of two or more organic, non-aromatic, substance comprising at least two hydroxyl groups.

In one embodiment of the present invention, the at least one organic, non-aromatic, substance, comprising at least two hydroxyl groups does not contain an epoxy-group.

In one embodiment of the present invention, the at least one organic, non-aromatic, substance, comprising at least two hydroxyl groups does not contain any nitrogen, phosphorous, silicon, potassium, sodium or fluorine.

In one embodiment of the present invention, compound A is a polyol like e.g. a diol, triol or a tetriol, more preferably compound A is selected from the group propylene glycol, glycerol, maltodextrin, erythritol, xylitol, sorbitol and mannitol, most preferably compound A is selected from glycerol and maltodextrin.

Compound B comprises at least one organic, non-aromatic, substance, comprising at least two carboxyl groups and is a monomer or an oligomer. Compound B can either be constituted by only one single organic, non-aromatic substance comprising at least two carboxyl groups or being a mixture of two or more organic, non-aromatic, substance comprising at least two carboxyl groups.

In one embodiment of the present invention, the at least one organic, non-aromatic, substance, comprising at least two carboxyl groups does not contain an epoxy-group.

In one embodiment of the present invention, the at least one organic, non-aromatic, substance, comprising at least two carboxyl groups does not contain any nitrogen, phosphorous, silicon, potassium, sodium or fluorine.

In one embodiment of the present invention, the at least one organic, non-aromatic substance, comprising at least two carboxyl groups is selected from the group citric acid, tartaric acid, succinic acid, fumaric acid, maleic acid and carballylic acid, polyacrylic acid oligomer, most preferably compound B is citric acid.

The amount of compound A and B are such that the molar ratio of the hydroxyl groups in compound A and the carboxyl groups in compound B is between 0.1 and 10, preferably between 0.5 and 2.0, most preferably 0.8 and 1.2.

In one embodiment of the present invention, the total amount of compound A and compound B is between 2 and 80 wt %, preferably between 30 and 80 wt % and most preferably between 30 and 50 wt %.

In one embodiment of the present invention, the total amount of compound A and B is more than 80 wt % of the "dry" components, i.e. when the solvent is excluded.

The thermoset binder can also contain other additives such as surfactants, pH-adjusters e.g. ethanol, ethylene glycol, ethylene glycol monobutyl ether.

The compound A and B together with the, if added, other additives are dissolved in a solvent. Preferably, the solvent is water based, i.e. the solvent contains more than 50 vol % water, preferably more than 60 vol % water, most preferably, the solvent is 100% water.

In one embodiment of the present invention, the binder comprises glycerol in an amount of between 35 and 50 wt %, citric acid in an amount of between 15 and 25 wt %.

In one embodiment of the present invention, the binder can be used together with other binders to further increase the green strength. The total amount of compound A and B should then be at least 2 wt % of the total amount of binder.

The present invention also relates to a method of making a cemented carbide or cermet body using a binder according to the above. The method comprises the following steps:

- providing a ready-to-print cemented carbide or cermet powder,
- providing a water soluble thermoset binder,
- printing said powder by binder jetting technique into a green body,
- curing said body by heating at a temperature between 100° C. and 250° C.
- sinter said green body
- wherein the water soluble two-component binder comprises a compound A being at least one organic, non-aromatic substance, comprising at least two hydroxyl groups and a compound B being at least one organic, non-aromatic, substance, comprising at least two carboxyl groups, wherein the compound A and compound B are monomers or oligomers.

The term "cermet" is herein intended to denote a material comprising hard constituents in a metallic binder phase, wherein the hard constituents comprise carbides or carbonitrides of one or more of Ta, Ti, Nb, Cr, Hf, V, Mo and Zr, such as TiN, TiC and/or TiCN.

The term "cemented carbide" is herein intended to denote a material comprising hard constituents in a metallic binder phase, wherein the hard constituents comprise at least 50 wt % WC grains. The hard constituents can also comprise carbides or carbonitrides of one or more of Ta, Ti, Nb, Cr, Hf, V, Mo and Zr, such as TiN, TiC and/or TiCN.

The metallic binder phase in the cermet or in the cemented carbide is a metal or a metallic alloy, and the metal can for example be selected from Cr, Mo, Fe, Co or Ni alone or in any combination. Preferably the metallic binder phase comprises a combination of Co, Ni and Fe, a combination of Co and Ni, or only Co. The metallic binder phase can comprise other suitable metals as known to the skilled person. The average content of metallic binder phase in the powder is 4-15 wt %, preferably 8-13 wt % or 10-13 wt %.

The ready-to-print powder used in the method of making a three dimensional printing of a cermet or cemented carbide body, can be any powder comprising cermet or cemented carbide particles suitable for three dimensional printing.

By cermet or cemented carbide particles is herein meant that the particles have been pre-sintered. By pre-sintered it is herein meant that the powder has been sintered, such as using solid state sintering and/or liquid phase sintering.

Preferably, the ready-to-print powder is a pre-sintered powder comprising spherical cermet or cemented carbide particles with good flowability.

In one embodiment of the present invention the D50 of the cemented carbide and/or cermet particles is 5-35 μm, preferably 10-30 μm, more preferably 15-25 μm, most preferably 17-21 μm.

In one embodiment of the present invention, the ready-to-print powder has been pre-sintered so that the porosity of the cermet or cemented carbide particles is between 0-40% porosity, preferably between 5-20 vol %, or 15-20%.

In one embodiment of the present invention, the ready-to-print powder has been pre-sintered so that the porosity of the cermet or cemented carbide particles is between 0-20% porosity, preferably between 0-10 vol %, or 0-5 vol %, or that the particles are fully dense.

A certain porosity can in some cases contribute to the sintering activity during the sintering of the printed green body and depending on how much sintering activity that is desired for a particular cermet or cemented carbide composition, the porosity can be adjusted.

The porosity can for example be measured in a LOM at 1000× magnification.

In one embodiment of the present invention, the ready-to-print powder is made by:

- mixing a cermet or cemented carbide raw powder and organic binder
- spray drying said raw powder and thereby form a granulated raw powder
- pre-sintering said spray dried raw powder removing said organic binder and thereby—form a pre-sintered granulated powder,
- preprocessing said pre-sintered granulated powder until the desired particle size distribution is achieved and thereby form a ready-to-print-powder.

By preprocessing is herein meant that the pre-sintered granulated powder is de-agglomerated since the granules can be joined in clusters which can cause problems during printing. This can be done by a gentle milling step. If the grain size needs further adjusting, the milling step can be prolonged.

In one embodiment of the present invention the spray dried powder is sieved before the pre-sintering step, preferably sieved to remove particles larger than 42 μm in diameter. This is advantageous in that it reduces the risk of problems with very large particles in the powder.

In one embodiment of the present invention the ready-to-print powder comprises cemented carbide particles. The cemented carbide particles comprise WC with an average grain size of 0.5-5 μm or 0.5-2 μm. Preferably more than 80 wt % of the hard constituents are WC.

In one embodiment of the present invention the ready-to-print powder comprises cemented carbide particles comprises WC and Co in an amount of between 10 and 13 wt %. The cemented carbide particles have a D50 of between 17 and 21 μm and a porosity between 0 and 5 vol %.

Binder jetting is a well known, relatively cheap, 3D printing method. The method comprises the steps of first applying a powder layer and onto said powder layer selectively depositing a binder, and then, layer by layer, building a green body with the desired shape.

Curing is normally performed after the printing step. The thermoset binder is cured whereby the green body gets a sufficient green strength. The curing can be performed by subjecting the printed green body to an increased temperature of between 100 and 250° C., preferably between 140° C. and 200° C. for time period between 1 and 100 hours, preferably between 1 and 5 hours, before removal of the excessive powder. In one embodiment the curing is performed in a non-oxidation environment such as in Ar or $N_2$ and/or in low pressure or vacuum.

After the curing step, all excess powder is removed from the green body through a depowdering step. The depowdering can either be a dry process, i.e. the excess powder is e.g. blown of brushed off the green body. The depowdering can also be a wet process, i.e. immersing the green body into a solvent of any kind and simply rinse of the excess powder. Also vibrations such as ultrasonics etc. can be used, both in dry or wet depowdering.

The green body is then sintered in a sintering furnace by liquid phase sintering. Liquid phase sintering is performed at a temperature above the temperature for when the metallic binder in a particular cermet or cemented carbide composition melts. Preferably, the liquid phase sintering takes place at a temperature between 1350° C. and 1500° C. preferably, the duration for the liquid phase sintering is between 30 and 300 minutes, more preferably between 30 and 120 minutes.

The liquid phase sintering step is preferably performed in vacuum, i.e. so-called vacuum sintering. By that is herein meant that the pressure is below 0.5 mbar.

Liquid phase sintering step is common in the art of sintering cermets and cemented carbides and usually contains a debinding step prior to reaching the liquid phase sintering temperature, usually at a temperature of between 200° C. and 550° C. for about 30 and 120 minutes. The debinding step is performed in order to remove any residual binder, e.g. thermoset printing binder.

In one embodiment of the present invention, the cemented carbide or cermet bodies made according to this invention are cutting tools such as an insert, drill or end mill.

In one embodiment of the present invention, the cemented carbide or cermet bodies made according to this invention can be wear parts such as nozzles, seal rings, pump impellers, flow controllers for oil/gas etc.

EXAMPLE 1

Green bodies in shape of rectangular blocks of 60×15×5 mm were printed from a pre-sintered cemented carbide powder with mostly spherical-shaped granules that have a D10 of 11.1 μm, D50 of 20.3 μm and D90 of 33.6 μm. The composition of the powder was 12 wt % Co and balance WC. The average porosity of the granules is 0 vol %, or very close to zero.

The binder was prepared by mixing water, ethanol, glycerol and citric acid. The components were thoroughly stirred until all components had been dissolved. The composition is shown in Table 1. The molar ratio in Table 1 is thee molar ratio of the hydroxyl groups in compound A to the carboxyl groups in compound B.

TABLE 1

| | Water | Ethanol | Glycerol (Compound A) | Citric Acid (Compound B) | Molar ratio |
|---|---|---|---|---|---|
| Invention 1 | 21.6 wt % | 17.3 wt % | 42.7 wt % | 18.4 wt % | 4.8/1 |

Printing was performed in a binder jetting printing machine with a layer thickness during printing of 50 μm. The printing of powder was done in a "ExOne Innovent+". Saturation during printing was 110% and the scale factor of the parts were set to 1.

The saturation of printing binder is defined as the percent of the void volume that is filled with printing binder at a specified powder packing density (here the powder packing density is set to 60%). A higher saturation is needed when printing with a powder comprising a larger fraction of porous particles as compared to a lower fraction of porous particles.

During the printing the sequence for each layer was as follows: a 50 μm layer of the powder was spread over the bed, printing binder was spread in a pattern as defined in a CAD model, followed by drying of the printing binder to remove all or some of the solvent of the printing binder. This was repeated until the full height of the green body was printed. Thereafter curing was done overnight at 200° C. in vacuum. Depowdering was done manually by brush and pressurized air.

EXAMPLE 2

Green bodies were printed using the same process and cemented carbide powder as described in example 1 with difference that the binder was prepared by mixing Maltodextrin (dextrose equivalent around 18) and Citric acid with a commercial Aqueous Binder and that the saturation during printing was 100%. The components were thoroughly stirred until all Maltodextrin and Citric Acid had been dissolved. The composition is shown in Table 2. The molar ratio in Table 2 is thee molar ratio of the hydroxyl groups in compound A to the carboxyl groups in compound B.

TABLE 2

| | Competitor Aqueous Binder | Maltodextrin (Compound A) | Citric Acid (Compound B) | Molar ratio |
|---|---|---|---|---|
| Invention 3 | 96 wt % | 2 wt % | 2 wt % | 1.23/1 |

For comparison, a green body using only the commercial Aqueous binder was printed with the same powder and the same process as in Example 2.

EXAMPLE 3

After depowdering the strength of the green bodies were tested by transversal flexural test with a speed of 10 mm/min and a preload of 0.05N. The results are shown in table 3.

TABLE 3

| | Flexural Strength [MPa] |
|---|---|
| Invention 1 | 4.61 |
| Invention 2 | 2.55 |
| Comparative 1 | 1.65 |

In Table 3 it can clearly be seen that the green bodies with the binder according to the invention, Invention 1 and 2, shows a significant improvement in green strength compared to the commercial Aqueous binder.

The invention claimed is:

1. A use of a water-soluble thermoset binder for binder jetting of a cemented carbide or cermet green body, wherein the thermoset binder in the green body is hardened during a curing step at an elevated temperature, wherein the water-soluble thermoset binder comprises a compound A being at least one organic, non-aromatic substance, comprising at least two hydroxyl groups and a compound B being at least one organic, non-aromatic substance, comprising at least two carboxyl groups, wherein the compound A and compound B are monomers or oligomers with a molecular weight less than 2000 g/mol, wherein compound A and B do not contain nitrogen, phosphorous, silicon, potassium, sodium or fluorine, and wherein the total amount of compound A and B is between 30 and 80 wt %, wherein, prior to the curing step, compound A and compound B are soluble in water and, after the curing step, compound A and compound B have reacted with each other by cross-linking and formed ester bonds so as to provide a cured green body, wherein the binder does not dissolve after curing.

2. The use of the water-soluble thermoset binder according to claim 1, wherein compound A and B do not contain any epoxy group.

3. The use of the water-soluble thermoset binder according to claim 1, wherein the amounts of compound A and B are such that the molar ratio of the hydroxyl groups in compound A to the carboxyl groups in compound B is between 0.1 and 10.

4. The use of the water-soluble thermoset binder according to claim 1, wherein compound A is selected from propylene glycol, glycerol, maltodextrin, erythritol, xylitol, sorbitol and mannitol.

5. The use of the water-soluble thermoset binder according to claim 1, wherein compound B is selected from citric acid, tartaric acid, succinic acid, fumaric acid, maleic acid, polyacrylic acid oligomer and carballylic acid.

6. The use of the water-soluble thermoset binder according to claim 1, wherein compound A is selected from glycerol or maltodextrin and compound B is citric acid.

7. The use of the water-soluble thermoset binder according to claim 1, wherein the binder includes glycerol in an amount of between 35 and 50 wt %, and citric acid in an amount of between 15 and 25 wt %.

* * * * *